ary Examiner—Francis S. Husak
Assistant Examiner—Robert J. Charuat
Attorney, Agent, or Firm—Robert M. Krone; Joseph J. Kelly; Stephen C. Shear

United States Patent [19]
O'Connor et al.

[11] 3,960,472
[45] June 1, 1976

[54] BELLING ASSEMBLY AND METHOD OF FORMING A BELL END

[75] Inventors: John Vincent O'Connor, Englewood; Edmund Joseph Zolnick, Perry Park, Larkspur, both of Colo.

[73] Assignee: Johns-Manville Corporation, Denver, Colo.

[22] Filed: Oct. 3, 1974

[21] Appl. No.: 511,874

Related U.S. Application Data

[62] Division of Ser. No. 386,120, Aug. 6, 1973, abandoned.

[52] U.S. Cl. ............................ 425/393; 425/403; 425/DIG. 218; 264/318; 264/334
[51] Int. Cl.² ........................................ B29C 17/00
[58] Field of Search .............. 425/DIG. 14, DIG. 58, 425/ DIG. 211, DIG. 218, 438, 384, 392, 393, 403; 249/63, 66, 152, 178, 180, 181, 183, 184, 185, 186; 264/318, 334, 95, 249, 322, 296, 318

[56] References Cited
UNITED STATES PATENTS

| | | | |
|---|---|---|---|
| 639,508 | 12/1899 | Bonta | 249/181 |
| 3,205,535 | 8/1965 | Niessner et al. | 425/392 |
| 3,484,900 | 12/1965 | Sands et al. | 425/393 |
| 3,852,016 | 12/1974 | Delauzun | 425/393 |

*Primary Examiner*—Francis S. Husak
*Assistant Examiner*—Robert J. Charuat
*Attorney, Agent, or Firm*—Robert M. Krone; Joseph J. Kelly; Stephen C. Shear

[57] ABSTRACT

A method and assembly for forming the bell end of a bell and spigot joint connecting two pipes together are disclosed herein. The method, which also includes the formation of an inner circumferential groove in the bell end, utilizes a core section in forming the bell end and an adjacent groove forming arrangement in forming the inner circumferential groove. The groove forming arrangement comprises a plurality of core segments which cooperatively move in a plane perpendicular to the longitudinal axis of the bell forming core section between an expanded position to form the groove and a collapsed position for removing the ultimately formed bell end from the core and core segments. With the core segments in the collapsed or expanded position, an end section of a heat deformable pipe, heated to its deformable state, is contoured around the core section and core segments. Thereafter, the core segments, if initially collapsed, are moved to the expanded position. By this procedure a bell end including an inner circumferential groove is formed. After the pipe section has cooled, the core segments are moved to the collapsed position and the bell end separated from core section and segments.

7 Claims, 13 Drawing Figures

BELLING ASSEMBLY AND METHOD OF FORMING A BELL END

This is a division of application Ser. No. 386,120 filed Aug. 6, 1973, which application has been abandoned.

BACKGROUND OF THE INVENTION

1. Field of the Invention

The present invention relates generally to the formation of an inner circumferential groove in a pipe section and more particularly to a specific assembly for and specific methods of providing an inner circumferential groove in the bell end.

2. Description of Prior Art

Heretofore, there have been many suggested methods of seal connecting together two pipes. One such method utilizes a bell and spigot joint which includes a female counterpart member, commonly referred to as the bell end, having an enlarged sleeve defining an inner circumferential groove. An annular sealing gasket is provided within the groove and coaxial with the pipe. In this manner, the male counterpart member, commonly referred to as the spigot, can be inserted into the bell end with the gasket providing a seal therebetween.

There are many methods of forming the aforedescribed bell end and particularly the inner circumferential groove in the bell end. For example, U.S. Letters Pat. No. 3,520,047 issued to Muhlner et al discloses one method wherein the sealing gasket and a pair of retainer rings are positioned around the external surface of an elongated core. A thermoplastic pipe, which has been heated to its deformable state, is deformed concentrically around the core, gasket and support ring and allowed to cool. In this manner, a bell end is formed and includes an annular furrow defining an inner circumferential groove around the gasket and support rings.

Another method of forming an inner circumferential groove is disclosed in U.S. Letters Pat. Nos. 3,205,535 and 3,264,383, both being issued to Niessner et al. In these patents, a cylindrical core is provided including circumferentially spaced core sections which are movable in radial planes through the axis of the core. The heated end section of a pipe is deformed around the core and core sections, with the core sections being in radially extended positions, thereby forming a bell end including an inner circumferential groove. After the bell end is cooled, the core sections are moved in a radial direction inwardly for withdrawal of the core from the formed bell end.

As will become apparent hereinafter, the present invention provides a different method and assembly for forming an inner circumferential groove in a pipe section, the method and assembly of the present invention being both reliable and uncomplicated in design.

OBJECTS AND SUMMARY OF THE INVENTION

An object of the present invention is to provide a reliable method of forming an accurately contoured inner circumferential groove in a heat deformable pipe section and particularly in the bell end of a bell and spigot joint.

Another object of the present invention is to provide a relatively uncomplicated and reliable assembly for forming the aforestated inner circumferential groove.

The foregoing objects are achieved by utilizing a core section having a longitudinal axis and a predetermined outer circumferential surface configuration and a groove forming arrangement located adjacent the core section. The groove forming arrangement includes a plurality of core segments supported for cooperative movement in a predetermined plane perpendicular to the longitudinal axis of the core section. These segments are movable between an expanded position such that together the segments have an outer circumferential surface configuration which at all points is located outwardly from the outer surface configuration of the core section and a collapsed position inwardly of the expanded position.

An inner circumferential groove is formed in a heat deformable pipe section by first heating the pipe section to the range of thermoelastic deformability. Thereafter, the heated pipe section is moved over the aforestated core section and core segments to a predetermined position. In this regard, in one embodiment of the present invention the core segments are initially maintained in the collapsed position and subsequently moved to the expanded position after the pipe section reaches the predetermined position. Hence, the core segments deform the heated pipe section during their movement from the collapsed position to the expanded position to provide the inner circumferential groove. In another embodiment of the present invention, the core segments are initially maintained in the expanded position and during movement of the pipe section over these segments, the inner circumferential groove is formed.

After formation of the inner circumferential groove the heated pipe section is maintained in position over the core section and expanded core segments, at least until the temperature of the pipe section is below the range of thermoelastic deformability. Thereafter, the core segments are moved to the collapsed position and the pipe section is withdrawn from the core section and segments.

BRIEF DESCRIPTION OF THE DRAWINGS

FIG. 3 is a front elevational view, partially broken away, of the assembly of the present invention.

DETAILED DESCRIPTION AND PREFERRED EMBODIMENTS

Figure 1:
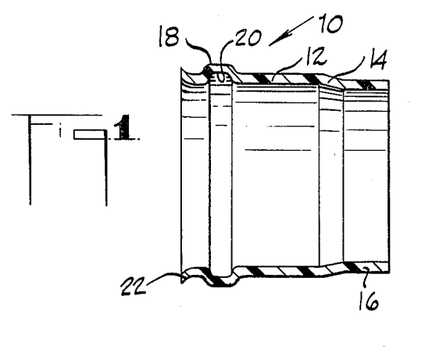
FIG. 1 is a cross-sectional view of a bell end formed in accordance with the present invention.

Turning now to the drawings, wherein like components are designated by like reference numerals throughout the various figures, the bell end 10 of a bell and spigot joint, formed in accordance with the present invention, is shown in FIG. 1. Bell end 10 is formed from one end section of a pipe constructed of a heat deformable material such as, for example, polyvinyl chloride and includes an enlarged bell-shaped sleeve 12 which tapers inwardly at 14 and merges with the undeformed section 16 of the pipe. As illustrated best in FIG. 1, the enlarged sleeve includes a radially outwardly extending annular furrow 18 which defines an inner circumferential channel or groove 20, the groove being adapted to receive an annular sealing gasked (not shown). Bell end 10 is adapted to receive an appropriately designed spigot (not shown) in a conventional co-axial fashion. In this regard, the free end of enlarged bell shaped sleeve 16 is preferably further enlarged outwardly at 22 in order to facilitate insertion of the spigot.

Having described bell end 10, attention is now directed to an assembly 24 which is constructed in accordance with the present invention and which is utilized in forming bell end 10 and particularly in forming inner circumferential groove 20. Assembly 24, commonly referred to as a belling head, comprises one component of an entire belling apparatus. In addition to the bell forming assembly or belling head, the apparatus generally includes a longitudinally extending table 26 and mounting stand 27 (see FIG. 2) upon which the bell forming assembly is supported, and means (not shown) for heating one end section 28 of a heat deformable pipe to a state of thermoelastic deformability. Further, means (not shown) are provided for moving the heated end section over and withdrawing it from the forming portion of the assembly and means (not shown) for cooling the end section after the bell end has been formed.

These components, which comprise part of the oveerall belling apparatus and which have not been shown, as well as other components comprising part of the overall belling apparatus are conventional and do not per se form part of the present invention. Hence, except for the way in which these components cooperate with assembly 24 is forming bell end 10, they will not be discussed herein.

Figure 2:
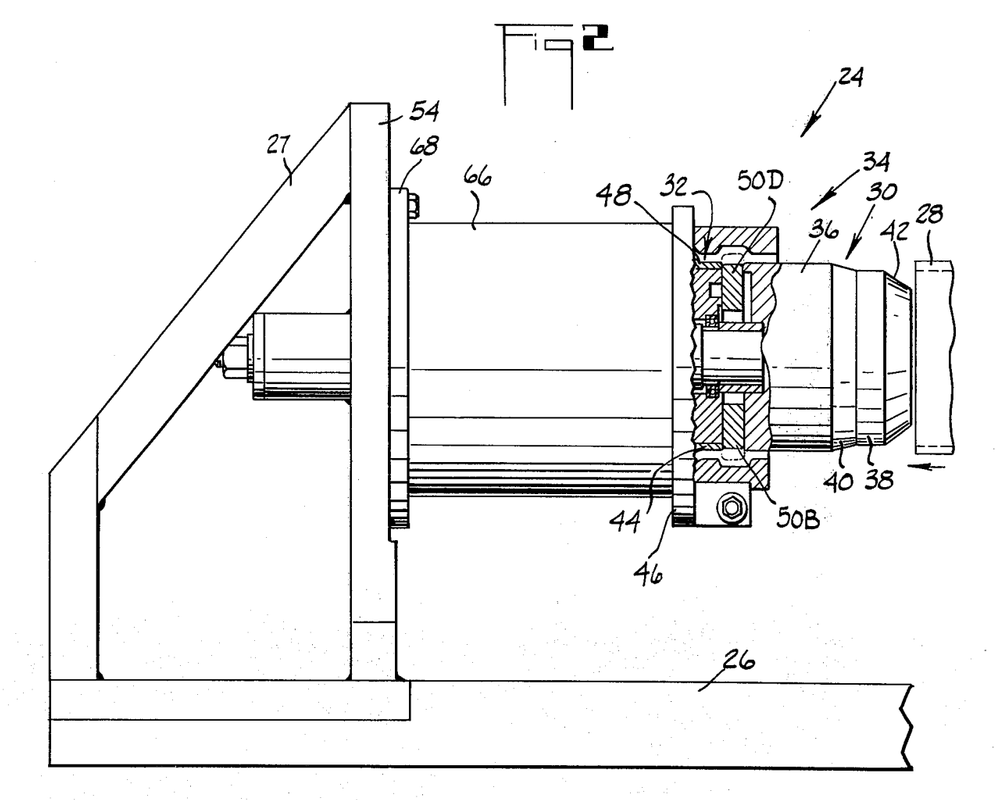
FIG. 2 is a side elevational view of a portion of an assembly which is constructed in accordance with the present invention and which is provided for use in forming the bell end of FIG. 1.

As illustrated in FIG. 2, assembly 24 includes a front core 30, a co-axial and spaced apart back core 32 and a groove forming arrangement 34, each of which is supported above table 26 by means and in a manner to be discussed hereinafter. As will also be discussed hereinafter, front core 30 and back core 32 are responsible for forming different sections of bell end 10. More specifically, the front core is responsible for forming that portion of the enlarged sleeve 12 which resides rearwardly of circumferential groove 20 and back core 32 is responsible for the formation of that portion of the enlarged sleeve which lies in front of the circumferential groove.

As seen in FIG. 2, front core 30 is comprised of a first cylindrical core section 36 and a second co-axial and radially smaller cylindrical core section 38 which are joined together by an intermediate tapering core section 40. The core section 38 includes a beveled or inwardly tapered end portion 42. Core 32 includes a cylindrical core section 44 which is co-axial with and has the same outer diameter as core section 36. Core section 44 merges with a radially greater annular flange 46 and in doing so defines an outwardly curving circumferential surface 48 which is responsible for the formation of outwardly tapering end 22 of bell shaped sleeve 12.

Groove forming arrangement 34, of course, is responsible for the formation of inner circumferential groove 20 formed in the bell shaped sleeve of bell end 10. As will be discussed in more detail hereinafter, arrangement 34 includes four core segments 50A, 50B, 50C and 50D (only 50A being shown in FIG. 2) which are located between core 30 and core 32. These core segments are supported for movement in a plane perpendicular to the longitudinal axis of core 30 and are movable between a collapsed position (shown by solid line in FIG. 2) and an expanded position (shown by dotted lines).

In operation, the end section 28 of a cylindrical heat deformable pipe, for example, polyvinyl chloride pipe, which has an inner diameter approximately equal to the outer diameter of core section 38, is heated to its state of thermoelastic deformability. It is then moved by conventional means over core sections 38, 40 and 36, thereafter over the core segments 50A through 50D and finally over core section 44 and up a portion of surface 48.

As will be seen, in accordance with one embodiment of the present invention, the core segments are initially maintained in the collapsed position until end section 28 reaches surface 48 of core section 44. At this time, the core segments are moved to the expanded position for forming an inner circumferential groove in the pipe end section. In another embodiment, however, the core segments are initially maintained in the expanded position. In both cases, the end section deforms so as to have an inner surface configuration similar to the combined outer surface configuration of the core sections and core segments (with the segments in the expanded position), resulting in bell end 10.

After formation, the bell end is cooled or allowed to cool to a temperature below the range of thermoelastic deformability. Thereafter, the core segments are moved to the collapsed position and the formed bell end is separated from the core sections and core segments. In this regard, while it is conventional to move the pipe relative to the bell forming assembly, it is to be understood that either of these two entities can be moved relative to the other or, in fact, they can both be moved simultaneously.

Having briefly described bell forming assembly 24, attention is now directed to FIGS. 3–10 for a detailed description of the assembly. As illustrated best in FIG. 4, assembly 24 includes a fixed central shaft 52 which extends from behind a vertical plate 54 comprising part of mounting stand 27 through the vertical plate and forwardly thereof in a direction parallel to table 26. The shaft is held in this position by a cylindrical housing 56 which is positioned over the back end of the shaft behind plate 54 and welded to the plate or otherwise suitably affixed thereto. A hexagonal nut and washer 58 and 60 respectively, are provided for securing the shaft to the housing. In addition, a mechanical key 62 interlocks the shaft to the housing for preventing the shaft from rotating about its axis.

Figure 4:
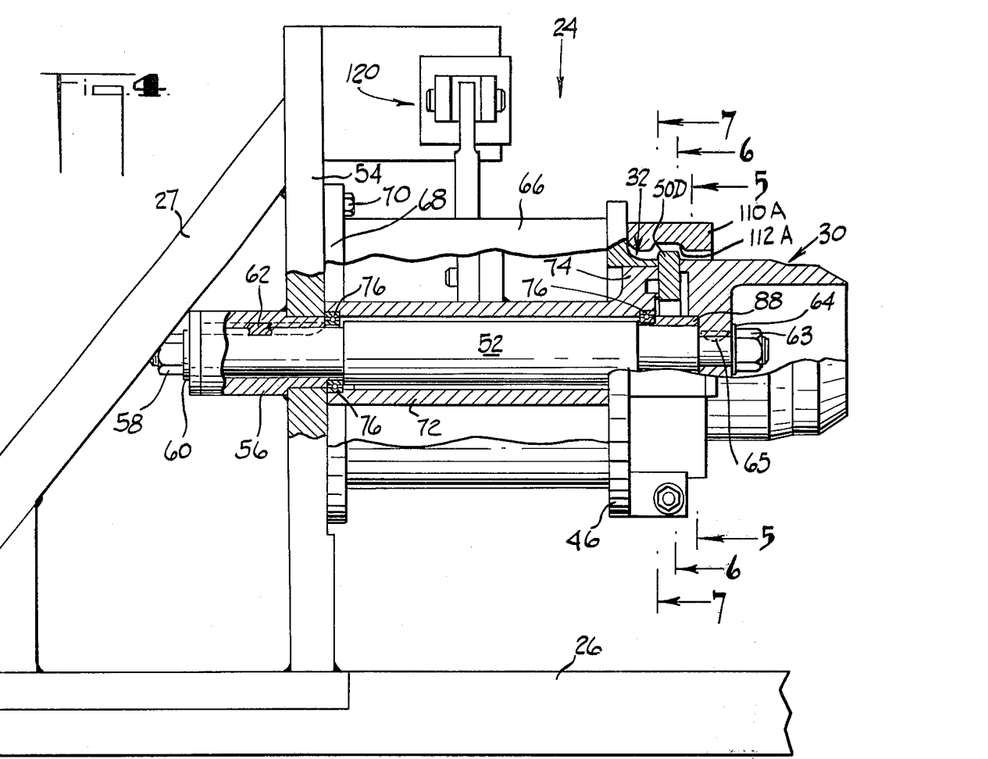
FIG. 4 is a partially broken away elevational view taken along line 4—4 of FIG. 3.

As stated above, assembly 24 includes cores 30 and 32. As shown in FIG. 4, core 30 is positioned concentrically around the forward end of the central shaft 52. It is attached to the shaft by means of a hexagonal nut 63 and washer 64. In addition, a ssecond mechanical key 65 is provided for interlocking core 30 with the central shaft for preventing the core from rotating about its axis. Core 32 is also positioned concentrically around central shaft 52, slightly rearwardly of core 30. Core 32 is held in this position by means of a rearwardly located cylindrical support sleeve 66 which is also positioned concentrically around shaft 52. The support sleeve has one end welded or otherwise suitably connected with core 32 and its other end welded or otherwise connected with a support plate 68. The support plate is, in turn, connected by means of bolts 70 to the front face of vertical plate 54 comprising part of mounting stand 27.

As stated above, the groove forming arrangement 34 including cores segments 50A through 50D is provided as part of bell forming assembly 24. In addition, the groove forming arrangement includes a longitudinally extending cylindrical nub 72 integrally formed at one end with a radially outwardly extending annular flange 74. As illustrated best in FIG. 4, the cylindrical hub is positioned concentrically around central shaft 52 adjacent to and within support sleeve 66 such that the annular flange 74 resides adjacent to and within core 32. The hub hub annular flange are mounted in this position for rotation about shaft 52 by suitable means such as bearings 76 located between the shaft and the hub. and For reasons to become apparent hereinafter, the front face 78 of annular flange 74 includes four curved slots or cam ways 80A, 80B, 80C and 80D (see FIG. 7). These slots or cam ways are equally circumferentially spaced about the center of surface 78 and define paths which gradually curve radially inwardly from points equidistant from the center of surface 78. However, it should be noted that cam ways 80A and 80C define paths which curve inwardly a greater distance but at a more gradual rate than the paths defined by cam ways 80B and 80D. The reasons for these differences in the cam ways will be explained hereinafter.

Figure 5:
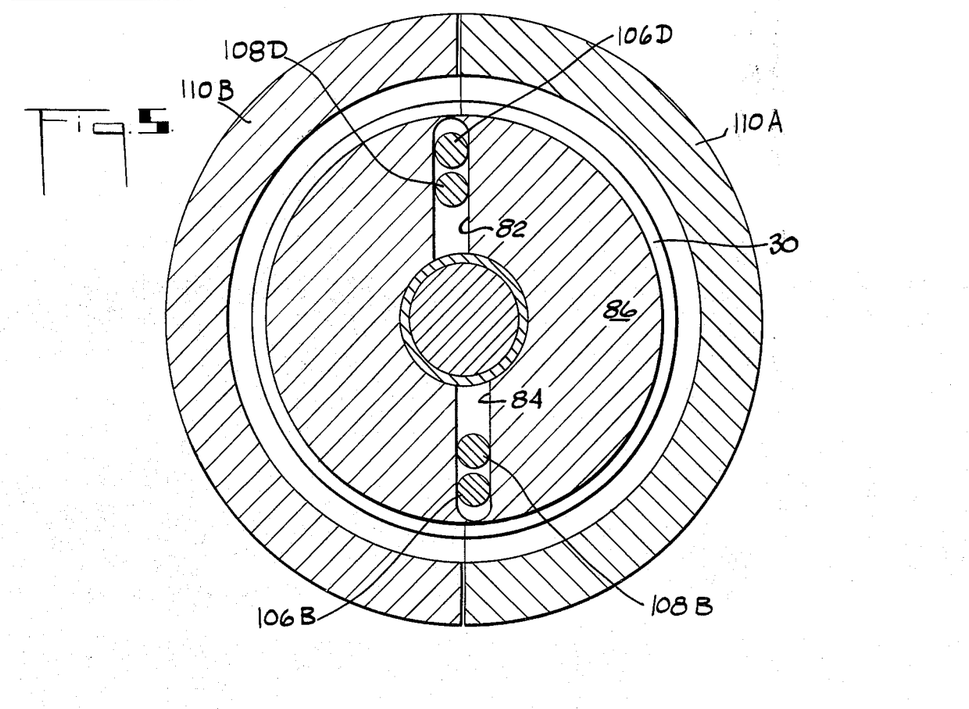
FIG. 5 is a sectional view taken along line 5—5 of FIG. 4.

In addition to the aforedescribed cam ways, groove forming arrangement 34 includes two additional cam ways 82 and 84 which can be best seen in FIG. 5. These additional cam ways are located in the back face 86 of core 30. As shown best in FIG. 4, back face 86 extends around a spacer 88 which, in turn, is positioned around the shaft 52 and faces the front surface 78 of annular flange 74. The cam ways 82 and 84 are aligned on opposite sides of center shaft 52 and extend vertically along the diameter of surface 86. Like cam ways 80A through 80D, the purpose of these cam ways 82 and 84 will be discussed hereinafter.

Figure 6:
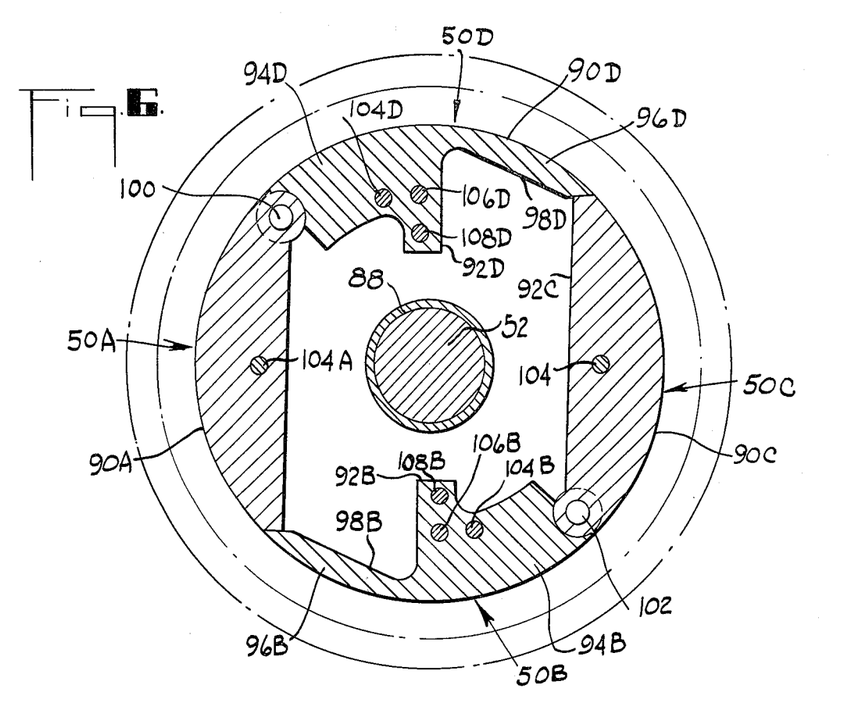
FIG. 6 is a sectional view taken along line 6—6 in FIG. 4.

Turning to FIG. 6, attention is now directed to a detailed discussion of core segments 80A, 80B, 80C and 80D. As noted in this figure, segments 80A and 80C are substantially identical and segments 80B and 80D are substantially identical. Each of the segments 80A and 80C includes an outer surface configuration 90A and 90C respectively which, in crosssection, defines a portion of a circle having its center at the center of shaft 52, this portion, in fact, defining approximately one-fourth of the circle. In a similar fashion, the core segments 80B and 80D respectively include outer surface configurations 90B and 90D which, in cross-section, define quarter segments or portions of the same circle.

The inner surfaces of core segments 80A and 80C, generally designated by the reference numerals 92A and 92C respectively, are relatively straight. On the other hand, the inner surfaces of core segments 80B and 80D, which are generally designated by the reference numerals 92B and 92D respectively, are substantially non-linear. In this regard, each of these segments include a thickened portion (94B and 94D respectively) and a substantially thinner portion (96B and 96D respectively) which join one another so as to define an inner pocket (98B and 98D respectively).

The core segment 50A is pivotally connected at one end to the thickened end of core segements 50D by a suitable pivot pin 100. In the same manner, one end of core segment 50C is pivotally connected to the thickened end of core segment 50B by a suitable pivot pin 102. As stated above and as will be discussed in more detail hereinafter, the four core segments are supported for movement between an expanded position and a collapsed position. The core segments are shown in the expanded position in FIG. 6. It should be noted that in this position, the combined outer surface configuration of the four segments define a substantially continuous circular path which, in fact, has a diameter greater than the outer diameter of core sections 30 and 32. In this regard, it should be apparent that the otherwise free ends of core segments 50A and 50B abutt one another and the otherwise free ends of core segments 50C and 50D abutt one another when the core segments are in the expanded position. As shown, each of these otherwise free ends has been suitably beveled so that the core segments 50A and 50C can pivot radially inwardly ahead of the core segments 50B and 50D as the core segments move to the collapsed position. A description of the core segments in this collapsed position will follow with respect to FIGS. 8, 9 and 10.

As best illustrated in FIG. 4, core segments 50A through 50D are positioned concentrically about central shaft 52 between the front face 78 of hub 72 and the back face 86 of core 30. In the expanded position (as shown in FIG. 4), it should be noted that the combined outer surface configuration of the core segments lies radially outwardly at all points from the outer circumferential surfaces of core sections 36 and 44. As will be seen hereinafter, in the collapsed position, the combined outer surface configuration of the core segments preferably lies entirely radially inwardly of the outer surfaces of core sections 36 and 44. In this regard, as will be seen, the combined outer surface configuration of the core segments when in the collapsed position does not define a continuous circle but rather one which is quite discontinuous. While it was stated that this surface configuration lies entirely inwardly of the outer surfaces of the adjacent core sections, it is quite possible for portions of this discontinuous outer surface configuration to lie flush with the outer surfaces of the core sections. In any case, in the collapsed position, substantially no portion of any of the core segments should extend radially outwardly beyond the outer surfaces of the adjacent core sections.

Figure 7:
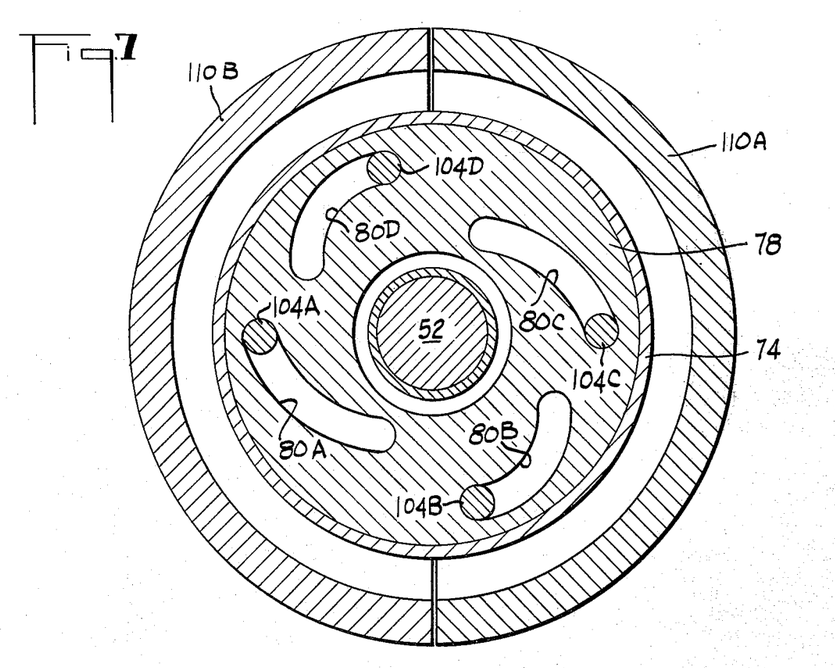
FIG. 7 is a sectional view taken along line 7—7 in FIG. 4.

In order to move core segments 50A through 50D between the aforedescribed expanded position and collapsed position, the core segments 50A through 50D are mechanically interlocked to cylindrical hub 72 by respective cam pins 104A, 104B, 104C and 104D. In addition, the segments 50B and 50D are mechanically interlocked to core 30 by cam pins 106B, 108B and 106D, 108D respectively. More specifically, one end of each of the cam pins 104A through 104D is suitably affixed to one side surface of respective core segments 50A through 50D, as best seen in FIG. 6. The other end of each of these cam pins is disposed for relative movement within and with respective cam ways 80A through 80D located in the front surface 78 of annular flange 74, as best seen in FIG. 7. By the same token, one end of each of the cam pins 106B, 108B and 106D, 108D is suitably affixed to the other side surface of core segments 50B and 50D respectively, as best illustrated in FIG. 6. The opposite ends of cam pins 106D and 108D are disposed for relative movement within and with cam way 82 located in the back surface 86 of core 30 and the opposite ends of cam pins 106B and 108B are disposed for relative movement within and with cam way 84, as best seen in FIG. 5.

Attention is now directed to the manner in which core segments 50A through 50D move between the expanded position and a collapsed position. For purposes of description, it will be assumed that the core segments are initially in the expanded position, as illustrated in FIGS. 4 to 7. In this position, it should be noted that the cam pins 104A through 104D are respectively located at the clockwise ends of cam ways 80A through 80D, as shown in FIG. 7. It should also be noted that the cam pins 106D and 108D are located at the uppermost end of cam way 82 and the cam pins 106B and 108B are located at the lowermost end of cam way 84, as best seen in FIG. 5.

As stated above, cylindrical hub 72 and associated annular flange 74 are mounted for rotation around central shaft 52. Means to be described hereinafter are utilized to provide a predetermined amount of rotation to the hub and flange, preferably approximately 45° of rotation in an actual working embodiment.

To move the core segments from the expanded position to the collapsed position, cylindrical hub 72 is rotated clockwise as viewed in FIGS. 3 and 7 and to move the core segments back to the expanded position, the hub is moved back counterclockwise. In response to the clockwise movement of the hub, it should be apparent from FIG. 7 that the cam ways 80A through 80D also moved clockwise. The amount of this movement is such that the cam pins 108A through 108D are ultimately located at the clockwise ends of their respective cam ways. During this movement, the cam ways and particularly the radially outer surfaces of the cam ways cause their associated cam pins to move inwardly in a substantially radial direction. This may best be seen in FIG. 8 where cam way 80D is shown by solid lines in its fully counterclockwise position and by dotted lines in its fully clockwise position. It should be apparent from this figure that the associated cam pin 104D moves substantially radially inwardly during clockwise movement of its associated cam way. The cam pin, of course, moves substantially radially outwardly as its associated cam way moves back in the counterclockwise direction. Cam pins 104A through 104C move radially inwardly and outwardly in a similar fashion.

It should be noted, that the cam ways 80A and 80C are greater in length than the cam ways 80B and 80D and curve more gradually than these latter cam ways, as best seen in FIG. 7. In addition, it should be noted that while the clockwise ends of all of these cam ways are equidistant from the center of central shaft 52, the counterclockwise ends of cam ways 80A and 80C are located closer to the center of the shaft than the counterclockwise ends of cam ways 80B and 80D. Hence, movement of the cam ways from their fully counterclockwise position to their fully clockwise position causes the cam pins 104A and 104C to move a greater distance radially inwardly but at a slower rate than the cam pins 104B and 104D. The reasons for this will become apparent hereinafter.

Having described the radial or approximately radial movement of cam pins 104A through 104D, attention is now directed to the manner in which these cam pins move core segments 80A through 80D between the expanded position and collapsed position. It should be apparent from FIG. 6 that inward movement of the cam pins tends to cause core segments 50A and 50D to pivot inwardly about pivot pin 100 and simultaneously tends to cause core segments 50B and 50C to pivot inwardly about pivot pin 102. However, as stated hereinabove, cam pins 106B, 108B, 106D and 108D are respectively affixed to core segments 50B and 50D and are disposed in cam ways 82 and 84 which are fixed in a vertical direction in the back surface 86 of core 30. Hence, the movement of core segments 50B and 50D are limited to vertical movements. Therefore, as the cam pins 104A through 104D move inward, the entire segments 50B and 50D move vertically inwardly while the core segments 50A and 50C respectively pivot inwardly about pivot pins 100 and 102. In this regard, as the core segments move in this manner, cam pins 106B, 108B, 106D and 108D respectively move down and up cam ways 82 and 84 to the positions indicated by dotted lines in FIG. 5.

Figures 8, 9:
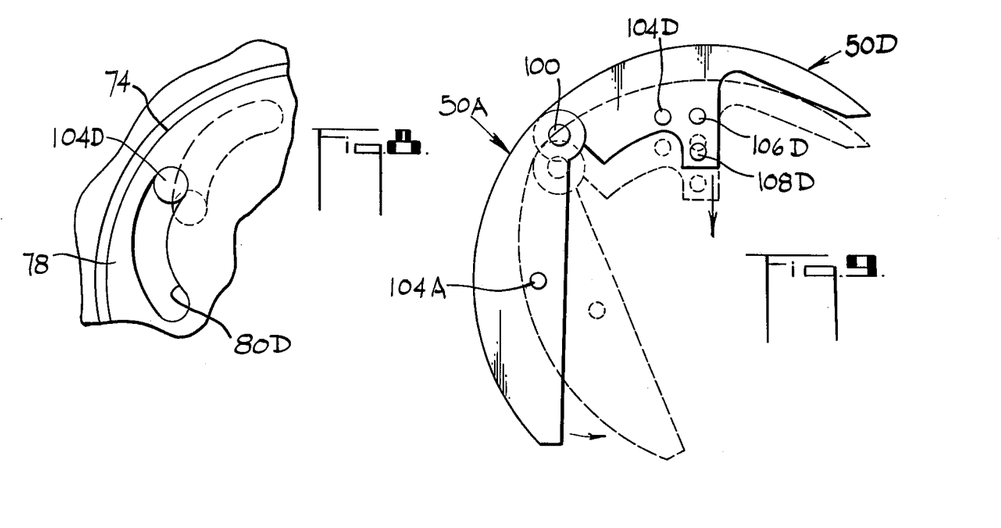
FIG. 8 is a schematic illustration depicting an operational feature of the assembly of the present invention.
FIG. 9 is a schematic illustration depicting another operational feature of the assembly of the prersent invention.
Figure 10:
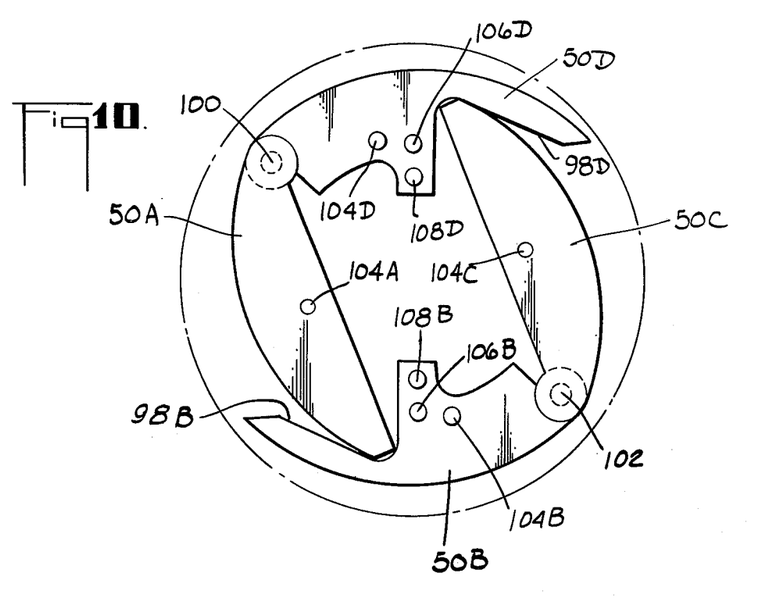
FIG. 10 is a front elevational view of an arrangement comprising part of the assembly of the present invention.

To illustrate the foregoing, attention is, directed to FIG. 9 which shows core segments 50A and 50D located in the expanded position (solid lines) and in the collapsed position (dotted lines). As noted in this figure, segment 50D moves vertically inwardly and segment 50A pivots inwardly about pivot pin 100. It should also be noted that during this movement the pivot pin itself moves radially inwardly, due to movement of segment 50A. Hence, the combined outer surface configuration of the two core segments moves radially inwardly. Core segments 50B and 50C move in the same manner. In fact, FIG. 10 illustrated the four segments in the collapsed position. The imaginary circle provided around the collapsed core segments represents the combined outer surface configuration of the segments when in the expanded position.

Upon comparing the core segments in the expanded position, as illustrated in FIG. 6, and the collapsed position, as illustrated in FIG. 10, it should be apparent that when going from the expanded position to the collapsed position, the core segments 50B and 50D move behind segments 50A and 50C. During this movement, the free ends of segments 50A and 50C respectively slide into the pockets 98B and 98D provided in segments 50B and 50D. Also during this movement, it should be noted that segments 50B and 50D move at a greater rate of speed than the other two segments, in effect, forcing these other segments inwardly as they move into their associated pockets. In this regard, it should be noted, as stated above, that the segments 50A and 50C move further inwardly, actually their associated pins 104A and 104C move further inwardly than segments 50B and 50D. Of course, going from the collapsed position to the expanded position, segments 50B and 50D will move ahead of segments 50A and 50C. Otherwise, movement of each of the segments is essentially the same as described, but reversed in direction.

As will be seen hereinafter, the aforedescribed core segments are responsible for forming an inner circumferential groove in a pipe section and are particularly responsible for the internal surface configuration of the groove. In some cases, it may be desirable and even necessary to provide external means for shaping the external surface configuration around the groove which, in turn, aids in forming the groove's internal surface configuration. Hence, groove forming arrangement 34 of bell forming assembly 24 includes such means. More specifically, as illustrated best in FIGS. 3 and 4, arrangement 34 includes two semi-circular clamps 110A and 110B which are preferably identical and which include inner circumferential grooves 112A and 112B respectively extending their lengths. The groove 112B is not shown and the groove 112A is only shown in cross-section, as seen in FIG. 4.

The two clamps 110A and 110B are positioned on opposite sides of cores 30 and 32 at the adjacent ends of these cores so as to form a continuous circle around core segments 50A through 50D. In these positions, the internal grooves 112A and 112B together provide a continuous circumferential groove around and radially spaced from the outer surface configuration of core segments 50A through 50D when the core segments are in an expanded position, as illustrated best in FIG. 4. Preferably, the cross-sectional configuration of grooves 112A and 112B is similar to but wider than the cross-sectional configuration of the core segments near the outer surface of the segments.

For reasons to be set forth hereinafter, clamps 110A and 110B are movable between the aforedescribed position, i.e., the joined position and a retracted position such that the clamps are located a further distance away, in opposite directions, from cores 30, core 32 and segments 50A through 50D. The clamps are supported for this movement by means of two horizontally extending rails 113 and 114 respectively positioned and suitably supported above and below the cores. Each of the clamps includes upper and lower journaled flange 116 and 118 respectively which slidably move along the rails, as indicated best in FIG. 3. Means to be described below are provided for moving the clamps between the joined and retracted positions.

As stated hereinabove, suitable means are provided for rotating cylindrical hub 72 about central shaft 52. In accordance with a working embodiment of the present invention, this movement is accomplished by a piston and cylinder arrangement 120 (see FIG. 3) which is suitably mounted above and to one side of support sleeve 66. Arrangement 120 includes a hydraulic or other such cylinder 122 suitably pivotally mounted at its back end to a fixed surface and a cooperating piston 124. A swing arm 126 is pivotally connected at one end to the free end of piston 124 and is connected at its other end to cylindrical hub 72 through a suitably dimensioned slot (not shown) provided in the support sleeve 66. The swing arm is connected to the cylindrical hub such that the hub rotates counterclockwise as the piston moves from its retracted position (solid lines in FIG. 3) to its extended position (dotted lines in FIG. 3).

Also in accordance with a working embodiment of the present invention, clamps 110A and 110B are moved in the aforedescribed manner, i.e., between the joined and retracted positions, by means of piston and cylinder arrangements 130 which are preferably similar to arrangement 120. However, as noted in FIG. 3, the pistons comprising arrangements 130 are directly connected to the clamps. As these pistons move from their extended positions to their retracted positions, the clamps move from the aforestated joined position to the expanded position.

Figure 11:
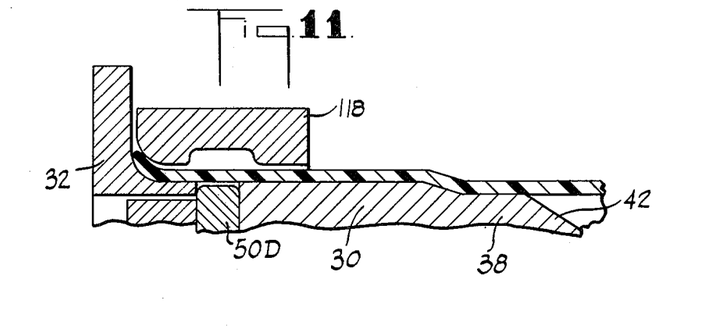
FIGS. 11, 12 and 13 for frontal cross-sectional views illustrating a portion of the assembly of the present invention and also illustrating the formation of the bell end of FIG. 1 utilizing this assembly.

With the bell forming assembly constructed in the aforedescribed manner, attention is now directed to a method of forming bell end 10 in accordance with one embodiment of the present invention. As illustrated in FIG. 11, core segments 50A through 50D (only segment 50A being shown) are in the collapsed position and the clamps 110A and 110B (only 118A being shown), if used, are initially in the joined position. After the end section 28 of an appropriately dimensioned heat deformable pipe has been heated to the range of thermoelastic deformability, which can be provided in any suitable way (not shown), the free end of the heated pipe section is positioned concentrically around the free end of core section 38, being aided by the bevel 42. The heated end section is then caused to move forward up tapered section 40, along and over core section 36, core segments 50A through 50D and core section 44 and up surface 48.

Figure 12:
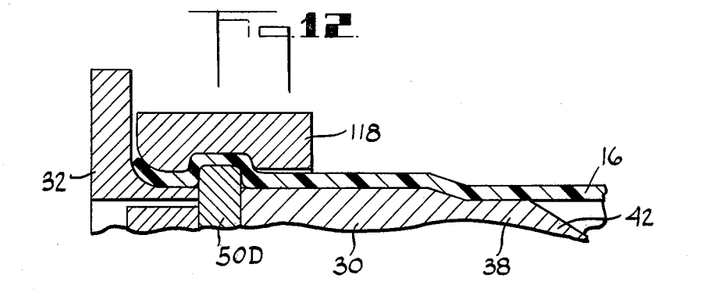
Figure 13:
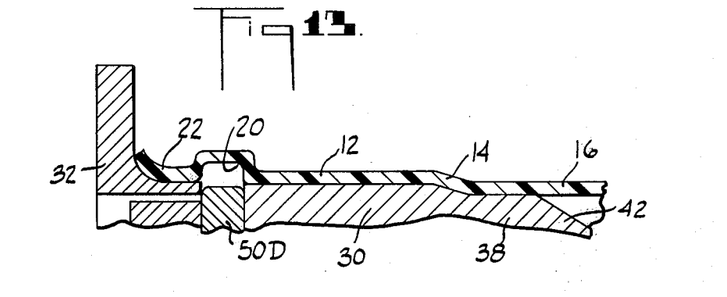

When the free end of heated pipe section 28 reaches the position illustrated in FIG. 11, core segments 50A through 50D are moved in the plane perpendicular to the longitudinal axis of core 30 from the collapsed position to the expanded position, as shown in FIG. 12.

The aforedescribed movement of heated end section 28 and the aforedescribed movement of the core segments deform the heated end section so that, when the core segments reach the expanded position, the pipe section has an internal surface configuration similar to the external surface configuration of the combined core sections and segments wherein the bell shaped sleeve 12 of bell end 10 is formed and wherein the core segments form inner circumferential groove 20 in the enlarged sleeve. In addition, the external surface configuration of the furrow defining groove 20 takes the contour of the internal surfaces of grooves 112A and 112B of clamps 110A and 110B. In this regard, internal suction, not shown and actually not used with the preferred embodiments of the present invention, could be provided by conventional means including appropriate sealing means for further contouring the heated pipe section about the cores and core segements.

After formation of bell end 10, the newly formed bell end is allowed to cool to a temperature below the range of thermoelastic deformability by, for example, exposure to ambient temperature or by application of a cooling fluid thereto. Once the bell end has sufficiently cooled, the core segments are moved to the collapsed position and the clamps are moved to the retracted position. Once this has occurred, the bell end is withdrawn from the cores and core segments.

The heated end section 28 may be positioned around the cores and core segments and separated therefrom after formation of bell end 10 by conventional means not shown. In this regard, while the heated end was described as moving onto and over the cores, it should be readily apparent that the cores and core segments could be moved into the heated end or both could be moved simultaneously. In addition, while not shown, conventional means could be provided for automatically providing synchronized movement of all of the aforedescribed moving components.

Bell end 10 can be formed in accordance with a second method utilizing bell forming assembly 24. This method is substantially the same as the aforedescribed method with two exceptions. As a first exception, the core segments are initially positioned in the expanded position rather than the collapsed position so that inner circumferential groove 20 is formed during movement over the core segments. In this regard, as a second exception, the clamps 110A and 110B may not be necessary. In fact, if used they would preferably be initially maintained in the retracted position and then moved to the joining position after the heated end section 28 reaches surface 48, thereby aiding the outer surface configuration of the groove. It should be noted that this method, as opposed to the first method described, is more conductive for utilizing the aforedescribed internal suction. In fact, with this method and particularly with the clamps initially maintained in the retracted position, external pressure directed radially inwardly could be conventionally utilized in aiding in contouring the heated end section around the cores and core segments.

Whether the first described method or the second described method should be used will depend in large part on the cross-sectional configuration of the inner circumferential groove to be formed. More specifically, if the sides of the groove (looking at the groove in section) are relatively vertical as illustrated in FIG. 1, the first method, i.e., with the core segments initially in the collapsed position, should preferably be used. By the same token, if the sides of the ultimately formed groove are more rounded, either the first or second method could be provided. In this regard, the present invention is, of course, not limited to the configuration of the groove as illustrated. Moreover, the present invention is not limited to the formation of a bell end having a circular cross-section but contemplates other cross-sectional configurations. Of course, assembly 23, actually cores 30 and 32, segments 50A through 50D and clamps 110A and 110B will conform in cross-sectional surface configuration to that of the particular bell end cross-section. In addition, while a bell end was formed in accordance with the present invention, the present invention may be readily provided for forming the inner circumferential groove in a pipe section without forming the enlarged sleeve.

What is claimed is:

1. An assembly for use in forming an inner circumferential groove in a heat deformable pipe, said assembly comprising:
   a. a core section having a longitudinal axis and a predetermined outer circumferential surface configuration;
   b. a plurality of core segments located adjacent said core section;
   c. means supporting said core segments for cooperative movement in a predetermined plane perpendicular to said axis, said segments being movable in said plane between an expanded position such that together said segments have an outer circumferential surface configuration which at all points is located outwardly from the outer surface configuration of said core section and a collapsed position inwardly of said expanded position, said supporting means supporting predetermined ones of said segments for pivotal movement about respective axes parallel with said longitudinal axis during movement of said segments between said expanded and collapsed positions, and supporting predetermined ones of said segments for straight line movement in said predetermined plane; and
   d. means for moving said core segments between said expanded position and said collapsed position.

2. An assembly according to claim 1 wherein said core section has a circular outer circumferential surface configuration and said core segments, when in said expanded position, together have a continuous, circular outer circumferential surface configuration.

3. An assembly according to claim 1 wherein said core segments, when in said collapsed position, together have a discontinuous outer circumferential surface configuration at least a portion of which lies inwardly of the outer surface configuration of said core section.

4. An assembly according to claim 1 including an even number of said core segments and wherein said supporting means supports half of said segments for movement ahead of another other half of said segments during movement between said expanded position to said collapsed position.

5. An assembly according to claim 4 wherein predetermined ones of said segments comprising half the number of said segments are supported to move a greater distance and at a slower rate of speed between said expanded and collapsed positions than the other segments.

6. An assembly for use in forming an inner circumferential groove in a heat pipe, said assembly comprising:
   a. a cylindrical core section having a longitudinal axis and a circular outer surface configuration;
   b. a groove forming arrangement including:
      i. a first pair of pivotally connected arcuate core segments comprising first and second segments, and
      ii. a second pair of pivotally connected arcuate core segments comprising third and fourth segments;
   c. said pairs of segments being positioned in engaging relationship with one another for movement between:
      i. an expanded position such that together said segments have a continuous circular outer surface configuration, and
      ii. a collapsed position such that together said segments have a discontinuous circumferential but non-circular surface configuration located radially inwardly of the expanded outer surface configuration;
   d. said groove forming arrangement being positioned adjacent to and co-axial with one end of said core section for movement between said expanded and collapsed positions in a plane perpendicular to the longitudinal axis of said core section, the expanded outer surface configuration of said arrangement being located radially outwardly of the outer surface configuration of said core segment and the collapsed outer surface configuration of said arrangement being located at least partially radially inwardly of the outer surface configuration of said core section;
   e. means for supporting said groove forming arrangement, said supporting means including
      i. a hub positioned in co-axial relationship with said core and mounted for pivotal movement about its axis, said hub including an end surface having four cam ways located therein;

ii. four cam pins, each of which has one end connected with a respective one of said core segments and its other end located in a respective one of said cam ways, and iii. means for locating movement of said first and third segments to straight line movement in the plane perpendicular to the longitudinal axis of said core section; and f. means for pivoting said hub about its axis whereby said cam ways pivot with said hub causing said cam pins to move in a radial direction for moving said core segments between said extended and collapsed position, the first and third core segments moving in a straight line and the second and fourth segments pivoting relative to said first and third segments during movement between the expanded and collapsed positions.

7. An assembly according to claim 6 including clamp means positioned concentrically around and spaced radially outwardly from said groove forming arrangement and adapted for aiding in shaping the outer and side surface configuration of said inner circumferential groove.

* * * * *

UNITED STATES PATENT AND TRADEMARK OFFICE
CERTIFICATE OF CORRECTION

PATENT NO. : 3,960,472

DATED : June 1, 1976

INVENTOR(S) : John Vincent O'Connor & Edmund Joseph Zolnick
and Arthur Richard Allen It is certified that error appears in the above-identified patent and that said Letters Patent are hereby corrected as shown below:

Title Page, Paragraph [75] should read -- John Vincent O'Connor, Englewood; Edmund Joseph Zolnick, Perry Park, Larkspur, Arthur Richard Allen, Lakewood, all of Colorado --.

Column 2, line 62, "prersent" should read --present--.
Column 2, line 67, "for" should read --are--.
Column 3, line 44, "oveerall" should read --overall--.
Column 3, line 50, "is" should read --in--.
Column 5, line 5, "ssecond" should read --second--.
Column 5, line 23, "nub" should read --hub--.
Column 5, line 29, "hub" should be written only once.
Column 5, line 32, "and" should be deleted.
Column 5, line 63, "crosssection" should read --cross-section--.
Column 11, line 13, "aiding the" should read --aiding in contouring the--.
Column 11, line 16, "conductive" should read --conducive--.
Column 12, line 66, Claim 6, "core and" should read --core segments and --.
Column 13, line 5, Claim 6, "locating" should read --limiting--.
Column 13, line 12, Claim 6, "extended" should read --expanded--.

Signed and Sealed this

Second Day of November 1976

[SEAL]

Attest:

RUTH C. MASON
Attesting Officer

C. MARSHALL DANN
Commissioner of Patents and Trademarks